(12) United States Patent
You et al.

(10) Patent No.: US 7,410,570 B2
(45) Date of Patent: Aug. 12, 2008

(54) SEPARATING DEVICE

(75) Inventors: Huey-Song You, Hsinchu (TW); Ming-Jing Peng, Hsinchu (TW); Kuan Foo Chang, Changhua County (TW); Sheng Hsin Chang, Miaoli County (TW); Shwu Huey Perng, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 21 days.

(21) Appl. No.: 11/440,482

(22) Filed: May 24, 2006

(65) Prior Publication Data

US 2007/0151909 A1 Jul. 5, 2007

(30) Foreign Application Priority Data

Dec. 30, 2005 (TW) .............................. 94147637 A

(51) Int. Cl.
*B01D 21/02* (2006.01)
(52) U.S. Cl. ...................... 210/188; 210/522; 210/537; 210/539
(58) Field of Classification Search ................. 210/188, 210/218, 195.1, 195.3, 195.4, 261, 262, 521, 210/522, 537, 539, 540
See application file for complete search history.

(56) References Cited

U.S. PATENT DOCUMENTS

| | | | | |
|---|---|---|---|---|
| 2,233,619 A | * | 3/1941 | Linch | 210/522 |
| 2,416,867 A | * | 3/1947 | Coberly | 210/188 |
| 2,889,929 A | * | 6/1959 | Kivell | 210/603 |
| 4,622,147 A | * | 11/1986 | Vellinga | 210/539 |
| RE32,597 E | * | 2/1988 | Pette | 210/188 |
| 4,780,206 A | * | 10/1988 | Beard et al. | 210/521 |
| 4,816,146 A | * | 3/1989 | Schertler | 210/522 |
| 5,338,445 A | * | 8/1994 | Zumbragel et al. | 210/188 |
| 5,500,118 A | * | 3/1996 | Coenen et al. | 210/188 |
| 5,718,824 A | * | 2/1998 | Kannan et al. | 210/521 |
| 6,478,963 B1 | * | 11/2002 | Rossmanith | 210/188 |
| 6,623,640 B2 | * | 9/2003 | Lanting et al. | 210/521 |

FOREIGN PATENT DOCUMENTS

| CN | 2360140 Y | 1/2000 |
|---|---|---|
| TW | 246123 | 4/1995 |
| TW | 350975 | 1/1999 |
| TW | 381586 | 2/2000 |

OTHER PUBLICATIONS

Cristiano Nicolella et al, "Particle-based biofilm reactor technology," TIBTECH, Jul. 2000, vol 18, pp. 312-320, UK.
C. Nicolella et al, "Wastewater treatment with particulate biofilm reactors," Journal of Biotechnology, 2000, vol. 80, pp. 1-33, UK.

* cited by examiner

*Primary Examiner*—Christopher Upton
(74) *Attorney, Agent, or Firm*—Quintero Law Office

(57) ABSTRACT

A separating device. The separating device is used in a tank, for separating solid, gas, and liquid of polluted water, including a first panel, and a plurality of first dividers. The first panel is disposed in the tank, includes a first body and a plurality of first tubes. The first body has a plurality of first openings. The first tubes, connected with the first openings, are disposed under the first body. The first dividers, corresponding to the first tubes, are horizontally disposed under the first tubes. A gap is formed between each first divider and each first tube. The first tube projects to the first divider, forming a projecting perimeter within the first divider.

22 Claims, 4 Drawing Sheets

SEPARATING DEVICE

BACKGROUND OF THE INVENTION

1. Field of the Invention

The invention relates to a separating device, and in particular, to a separating device used in a reacting tank, for separating solid, gas, and liquid from polluted water in the reacting tank.

2. Description of the Related Art

As shown in FIG. 1, a separating device, conventionally utilized in wastewater treatment, is often disposed in an anaerobic sludge tank 1. Wastewater, entering the tank 1, is decomposed under anaerobic conditions, producing biogas which includes methane, carbon dioxide and hydrogen gas. The gas rises with the upflow sludge through a guiding area 2 to a gas collecting area 3. The rest of the solid-liquid mixture enters a solid-liquid area 4 through a gap G. A slanting plate 5 separates the solid and the liquid, keeping solid material in the solid-liquid area 4. The liquid then overflows to a weir 6.

In the conventional separating device, a scum weir (not shown) disposed in the gas collecting area releases gas. However, the conventional separating device has an enclosed gas collection area. Problems such as when to discharge the scum, and how to completely discharge the scum frequently arise. Additionally, openings for the liquid to flow through are required, affecting overall intensity.

BRIEF SUMMARY OF THE INVENTION

The invention provides a separating device. The separating device is used in a tank to separate solid, gas, and liquid from polluted water, and comprises a first panel, and a plurality of first dividers. The first panel is disposed in the tank, and comprises a first body and a plurality of first tubes. The first body has a plurality of first openings. The first tubes, connected with the first openings, are disposed under the first body. The first dividers, corresponding to the first tubes, are horizontally disposed under the first tubes. A gap is formed between each first divider and each first tube. The first tube projects to the first divider, forming a projecting perimeter within the first divider.

A solid-liquid separation area is formed above the first panel, a gas collecting area is formed between the first panel and the first dividers, and a reacting area is formed under the first dividers.

The separating device further comprises a slanting plate, disposed in the solid-liquid separation area.

The separating device further comprises a weir, disposed in the solid-liquid separation area, above the slanting plate.

The separating device further comprises a bucket, communicating with the gas collecting area, collecting gas and scum from the tank.

The separating device further comprises a first tube, communicating with the gas collecting area.

The separating device further comprises second tube, communicating with the solid-liquid separation area.

The separating device further comprises a distribution tank, communicating with the solid-liquid area via the second tube.

The separating device further comprises a pump, disposed on the second tube.

The separating device further comprises a third tube, via which the distribution tank communicates with the reacting area.

The separating device further comprises a second panel, and a plurality of second dividers. The second panel, disposed in the tank, comprises a second body, a plurality of second tubes, and a collecting tube. The second body has a plurality of second openings and a third opening. The second tubes, connected with the second openings, are disposed under the second body. The collecting tube, connected with the third opening, is disposed above the second body. The second dividers, corresponding to the second tubes, are horizontally disposed under the second tubes. A gap is formed between each second divider and each second tube. The second tube projects to the second divider, forming a projecting perimeter within the second divider.

The first gas collecting area communicates with the second gas collecting area by the collecting tube.

The tank has a height between 15 and 25 meters.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
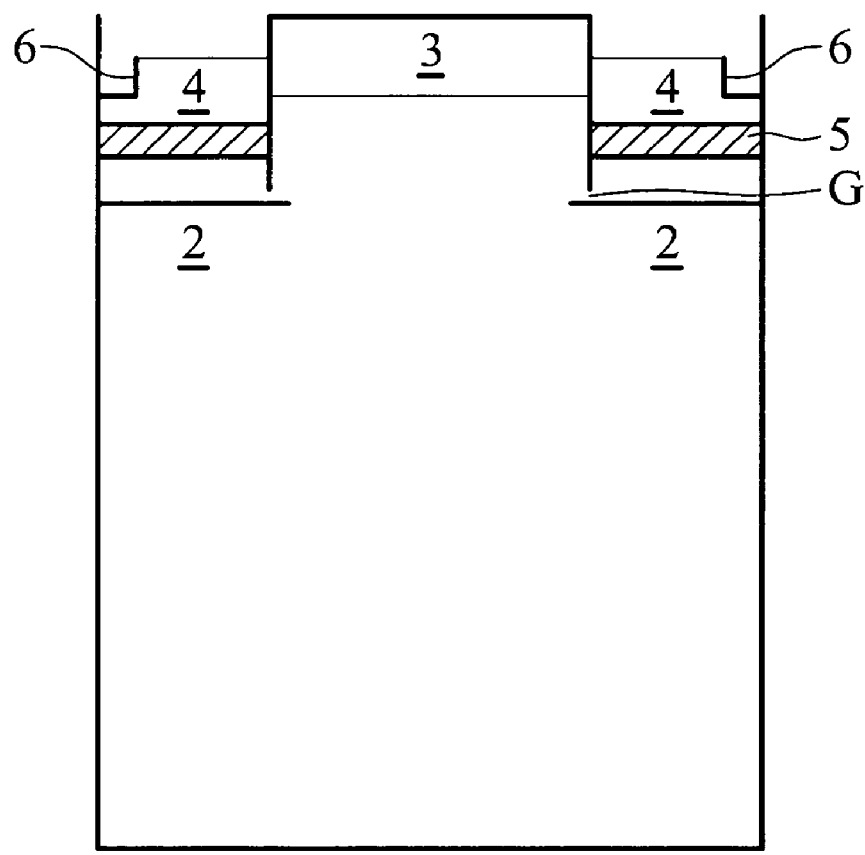
FIG. 1 is a schematic view of a conventional separating device and an anaerobic sludge tank.
Figure 2A:
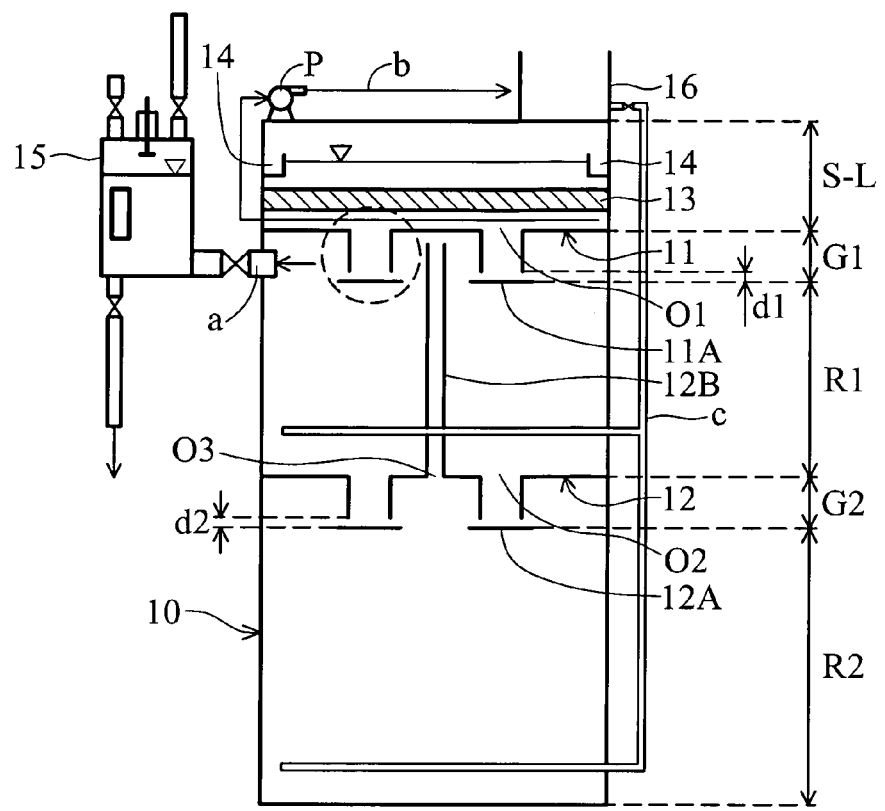
FIG. 2A is a schematic view of an embodiment of a separating device and a tank of the invention.

FIG. 2A depicts a separating device of an embodiment of the invention. The separating device is used in a tank 10 containing wastewater. The tank 10 is an upflow anaerobic sludge bed (UASB) tank, having a height between fifteen and twenty five meters. The separating device comprises a first panel 11, a plurality of first dividers 11A, a second panel 12, a plurality of second dividers 12A, a colleting tube 12B, a slanting plate 13, two weirs 14, a bucket 15, a distribution tank 16, a pump P, a first pipe a, a second pipe b, and a third pipe c. It should be noted that in FIG. 2A, only two first dividers 11A and two second dividers 12A are shown.

In the tank 10, the first divider 11 and the second divider 12 comprise a demarcation line, dividing the tank 10 into different sections. A solid-liquid separation area S-L is defined above the first panel 11, and a first gas collecting area G1 is defined between the first panel 11 and the first dividers 11A. A first reacting area R1 is defined between the first dividers 11A and the second panel 12. A second gas collecting area G2 is defined between the second panel 12 and the second dividers 12A. A second reacting area R2 is defined under the second dividers 12A.

Figure 2B:
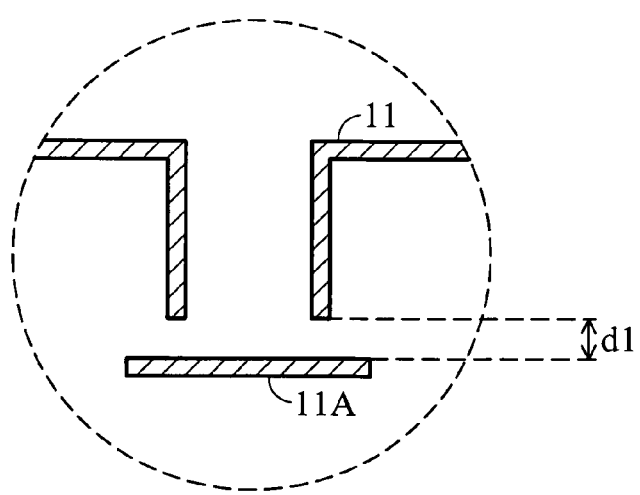
FIG. 2B is a schematic view showing a first pipe and a first divider in FIG. 2A.
Figure 3:
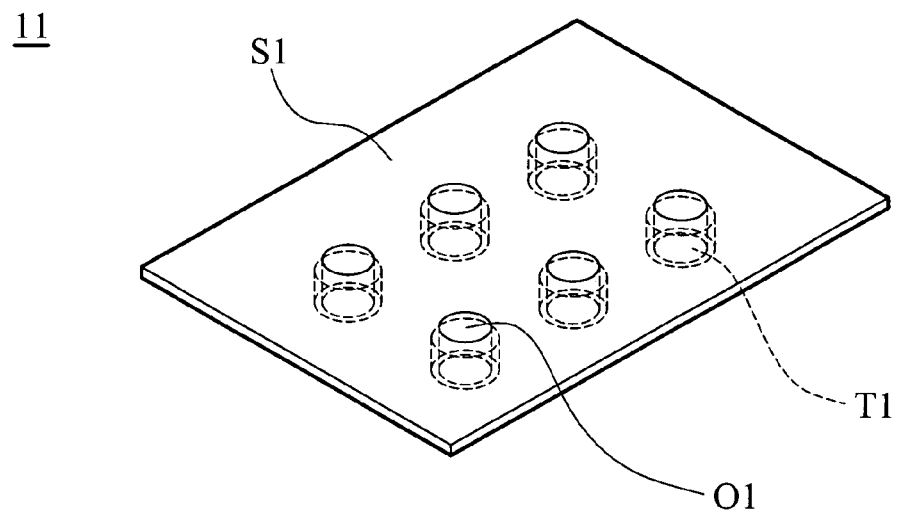
FIG. 3 is a schematic view of a first panel in FIG. 2A.

FIG. 3 is a schematic view of the first panel 11. The first panel 11 is disposed in the tank 10, and comprises a first body S1 and a plurality of first tubes T1. The first body S1 has a plurality of first openings O1, the number, the sizes, and shapes of the sections of which are not limited. The first tube T1 connects with the first opening O1, and the first tube T1 is beneath the first panel 11. The first divider 11A is disposed in respect to the first tube T1, and below the first tube T1. Each first divider 11A comprises a periphery extending radially to the corresponding first tube T1. A gap d1 is maintained between the first tube T1 and the first divider 11A (referring to FIG. 2B).

Figure 4:
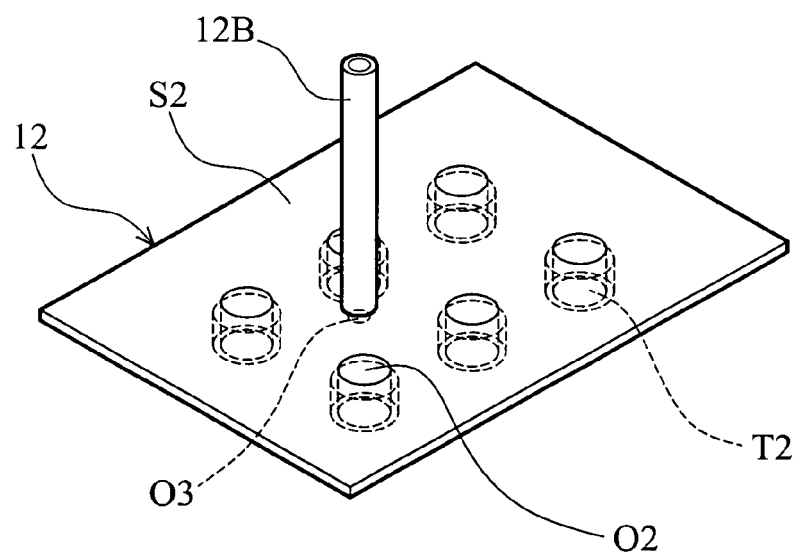
FIG. 4 is a schematic view of a second panel in FIG. 2A.

FIG. 4 is a schematic view of the second panel 12 disposed in the tank 10, and below the first panel 11, comprising a second body S2, a plurality of second tubes T2, and a third opening O3 (referring to FIG. 2A). The second body S2 has a plurality of second openings O2, wherein the number, the sizes, and shapes of which are not limited. The second tube T2 connects with the second opening O2, and is disposed beneath the second body S2. The second divider 12A is disposed in respect to the second tube T2, and below the second tube T2. A gap d2 is kept between the second tube T2 and the second divider 12A. The collecting tube 12B connects with the third opening O3, and is disposed above the second body S2, wherein the first gas collecting area G1 communicates with the second gas collecting area G2 by the collecting tube 12B. It should be noted that while one collecting tube 12B and one third opening O3 are shown, the embodiment is not limited thereto. The number, the sizes, and shapes of the collecting tube 12B and the third opening O3 are designed according to demand.

Referring to FIG. 2A again, the slanting plate 13 is disposed in the solid-liquid separation area S-L. Two weirs 14 are disposed on inner walls of the tank 10, respectively, above the slanting plate 13, although disposition of the weirs 14 is not limited thereto.

The bucket 15 communicates with the first gas collecting area G1 by the first pipe a, wherein the first pipe a is disposed near the first panel 11. The distribution tank 16 communicates with the solid-liquid separation area S-L by the second pipe b, and the pump P is disposed on the second pipe b. An end of the second pipe b extends to the solid-liquid separation area S-L, between the slanting plate 13 and the first panel 11. The distribution tank 16 communicates with the first and second reacting areas R1, R2 by the third pipe c, respectively.

Waste water in the tank 10 is a mixture comprising solid, gas, and liquid, which is received in the second reacting area R2 of the tank 10. The mixture flows up from the second reacting area R2, through the bottom of the second panel 12A, and toward the sides of the second panel 12A. A portion of gas is collected in the second gas collecting area G2, and enters the first gas collecting area G1 through the collecting tube 12B. Remaining mixture continuously flows to the first reacting area R1 through the gap d2 between the second panel 12A and the second tube T2. When the mixture reaches to the bottom of the first panel 11A, it moves toward the sides of the first panel 11A. Remaining gas in the mixture is collected in the first gas collecting area G1. Remaining mixture then flows to the solid-liquid separation area S-L through the gap d1 between the first divider 11A and the first tube T1.

The gas collected in the first gas collecting area G1 carries some solid scum. The gas and the scum along the under surface of the first panel 11 enter the bucket 15 through the first pipe a. Gas is exhausted out of the bucket 15, with the solid scum remaining. A window can be disposed on the bucket 15 to observe accumulation of the solid scum in the bucket 15. After a certain amount of solid scum is accumulated in the bucket 15, a valve (not shown) of the first pipe a is closed temporarily, such that the bucket 15 does not communicate with the first gas collecting area G1. Thus, the solid scum can be removed from the bucket 15.

The mixture in the solid-liquid separation area S-L continuously moves upward through the slanting plate 13. The solid in the mixture is blocked by the slanting plate 13, and precipitates on the first panel 11. The liquid then flows through the slanting plate 13, outflow through the weirs 14.

In the solid-liquid separation area S-L, the combined liquid and the solid precipitate on the first panel 11 is pumped through the second pipe b by the pump P, to the distribution tank 16. The mixture in the distribution tank 16 is recycled to the bottom of the first and second reacting areas R1, R2 through the third pipe c.

Figure 5:
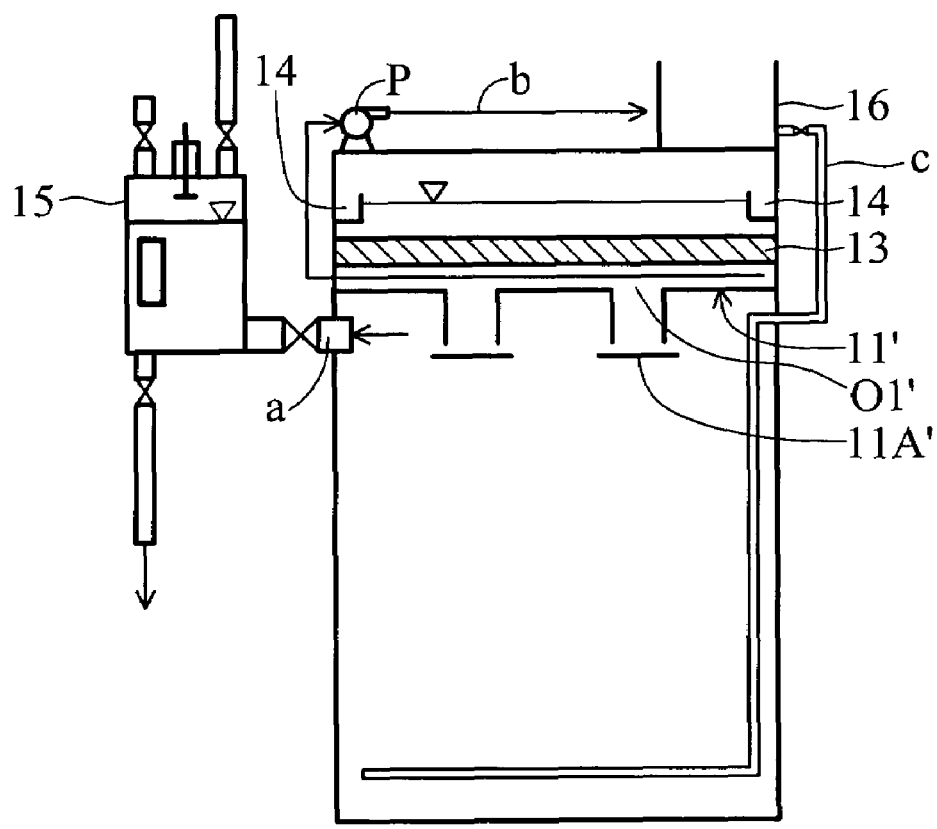
FIG. 5 is a schematic view of a variant embodiment of the separating device and the tank of the invention.

The superficial velocity of gaseous material increases with the height of the tank, reducing concentration of the sludge. Accordingly, when the superficial velocity of gaseous material reaches a certain limits, gas in the tank must be released from the reacting area. In the embodiment, the tank 10 has a certain height, such that two sets of panel 11, 12 and two sets of corresponding divider 11A, 12A are disposed in coordination with the tank 10. However, disposition is not limited thereto. As shown in FIG. 5, a single set of the panel 11' and the corresponding divider 11A' can be disposed in the tank 10', with other parts the same as the above embodiment.

The separating device of the invention can be simply constructed, especially when assembled as a module. Not only is construction cost successfully reduced, but problems releasing the scum are overcome. Additionally, the volume of the anaerobic tank is efficiently utilized.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A separating device, used in a tank to separate solid, gas, and liquid from polluted water, comprising:
    a first panel, disposed in the tank, comprising:
        a first body, having a plurality of first openings;
        a plurality of first tubes, connected with the first openings, disposed under the first body; and
    a plurality of first dividers, corresponding to the first tubes, horizontally disposed under the first tubes, each first divider being substantially planar and comprising a periphery extending radially to the corresponding first tube, and a gap formed between each first divider and each first tube;
    wherein each first tube projects to each first divider, forming a projecting perimeter within the first divider.

2. The separating device as claimed in claim 1, wherein a solid-liquid separation area is formed above the first panel, a first gas collecting area is formed between the first panel and the first dividers, and a reacting area is formed under the first dividers.

3. The separating device as claimed in claim 2, further comprising a slanting plate, disposed in the solid-liquid separation area.

4. The separating device as claimed in claim 3, further comprising a weir, disposed in the solid-liquid separation area, above the slanting plate.

5. The separating device as claimed in claim 2, further comprising a bucket, communicating with the gas collecting area, collecting gas and scum from the tank.

6. The separating device as claimed in claim 5, further comprising a first pipe, communicating with the gas collecting area with the bucket.

7. The separating device as claimed in claim 2, further comprising a second pipe, communicating with the solid-liquid separation area.

8. The separating device as claimed in claim 7, further comprising a distribution tank, communicating with the solid-liquid area via the second tube.

9. The separating device as claimed in claim 8, further comprising a pump, disposed on the second tube.

10. The separating device as claimed in claim 7, further comprising a third pipe, via which the distribution tank communicates with the reacting area.

11. The separating device as claimed in claim 2, further comprising:
- a second panel, disposed in the tank and below the first panel, comprising:
  - a second body, having a plurality of second openings and a third opening;
  - a plurality of second tubes, connected with the second openings, disposed under the second body;
  - a collecting tube, connected with the third opening, disposed above the second body and communicating with the first gas collecting area; and
  - a plurality of second dividers, corresponding to the second tubes, horizontally disposed under the second tubes, and a gap formed between each second divider and each second tube;
- wherein each second tube projects to each second divider, forming a projecting perimeter within the second divider.

12. The separating device as claimed in claim 11, wherein a solid-liquid separation area is formed above the first panel, a first gas collecting area is formed between the first panel and the first dividers, the first reacting area is formed between the first dividers and the second panel, a second gas collecting area is formed between the second panel and the second dividers, and a second reacting area is formed under the second dividers.

13. The separating device as claimed in claim 12, further comprising a slanting plate, disposed in the solid-liquid separation area.

14. The separating device as claimed in claim 13, further comprising a weir, disposed in the solid-liquid separation area, above the slanting plate.

15. The separating device as claimed in claim 12, further comprising a bucket, communicating with the first gas collecting area, collecting gas and scum from the tank.

16. The separating device as claimed in claim 15, further comprising a first pipe, communicating the first gas collecting area with the bucket.

17. The separating device as claimed in claim 12, further comprising a second pipe, communicating with the solid-liquid separation area.

18. The separating device as claimed in claim 17, further comprising a distribution tank, wherein the distribution tank communicates with the solid-liquid separation area by the second pipe.

19. The separating device as claimed in claim 18, further comprising a pump, disposed on the second pipe.

20. The separating device as claimed in claim 17, further comprising a third pipe, wherein the distribution tank communicates with the first and second reacting areas by the third pipe.

21. The separating device as claimed in claim 12, wherein the first gas collecting area communicates with the second gas collecting area by the collecting tube.

22. The separating device as claimed in claim 11, wherein the tank has a height between 15 and 25 meters.

* * * * *